3,546,053
STRIP UP MICROFICHE MASTER
George Goldberg, Jericho, N.Y., and Benjamin R. Mascolo, Brownsville, Tenn., assignors to Kleer-Vu Industries, Inc., New York, N.Y.
Filed Oct. 11, 1967, Ser. No. 674,584
Int. Cl. B32b 3/16
U.S. Cl. 161—38                                    1 Claim

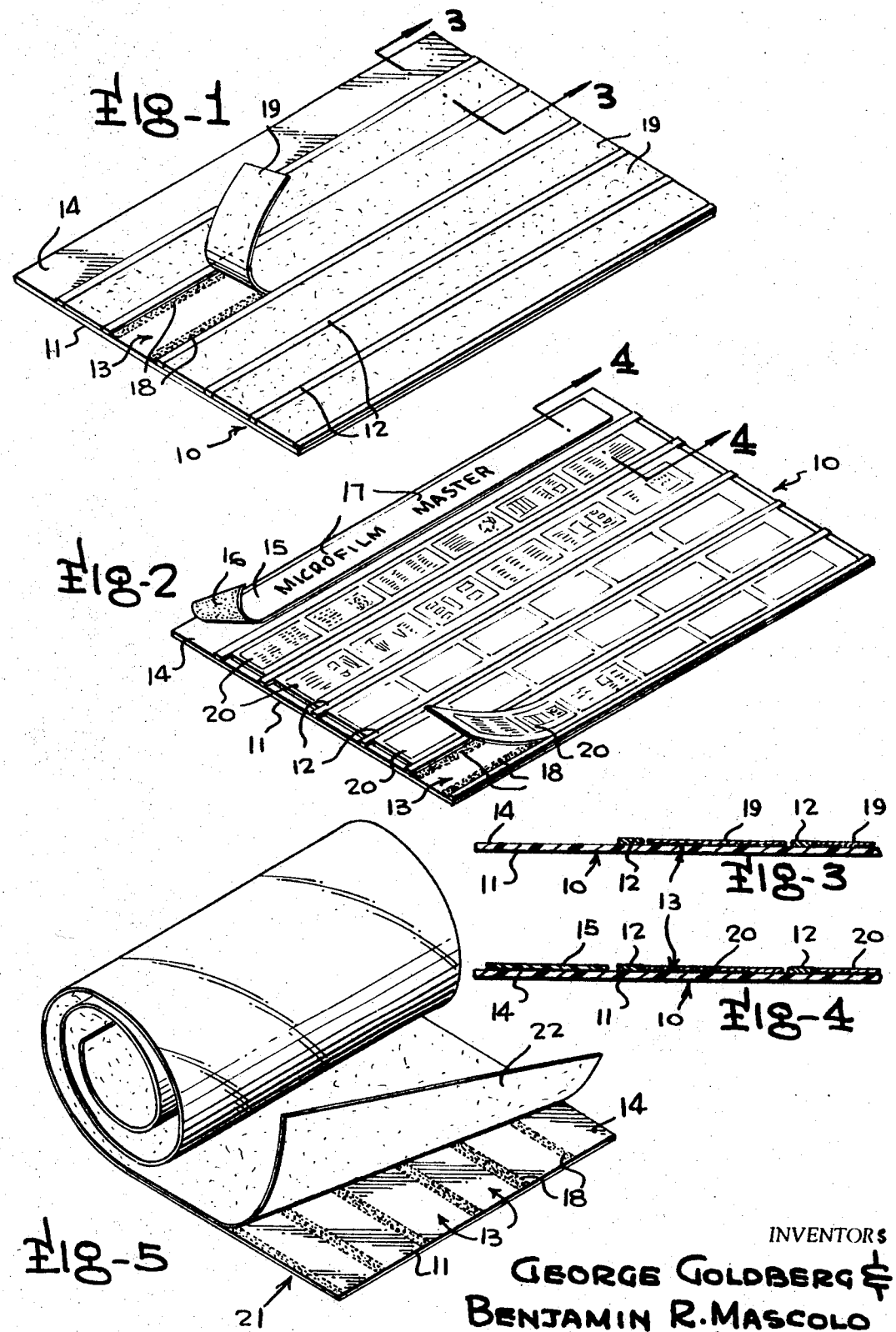

ABSTRACT OF THE DISCLOSURE

A method of and means for converting roll films to a microfiche master wherein a group of microfilm images are adapted to be placed on a single sheet rather than along a film roll so that, for example, a microfiche can be conveniently provided for incorporating on a single reproducible sheet, documents or other information relating to a particular subject matter or the like.

---

This invention relates to a method of and means for converting roll film to microfiche masters, wherein there is provided an adhesive on the fiche which easily and readily converts roll film to a unit filing system without costly preparations, and wherein the strip up microfiche can be used as a master to make perfect distribution copies with minimum resolution loss and the like.

An object of the present invention is to provide a microfiche master already prepared with adhesive strips in a predetermined path permitting the laying down of microfilm for filing and reproducing copies, and wherein according to the present invention the microfilm itself does not have to be prepared in any way, and the master is adapted with adhesive prepared to accept or resolve the laying down of film, and this is not only more economical and easier to handle than previous methods but, in addition, permitting the selection of microfilm frames at random or as desired from different rolls for placement on this master.

A further object is to provide a highly flexible system which allows for the addition or deletion of images as required or desired, and wherein the present invention is ideal for small or large installations.

Still another object is to provide an adhesive master that is economical to manufacture and efficient in use, and these and other objects of the invention will become apparent from the following specifications and claims, together with the accompanying drawings, wherein like parts are referred to and indicated by like reference characters, wherein:

FIG. 1 is a perspective view illustrating the adhesive master before any film has been placed thereon.

FIG. 2 is a view similar to FIG. 1 but illustrating the device after the film has been placed thereon.

FIG. 3 is a sectional view taken on the lines 3—3 of FIG. 1.

FIG. 4 is a sectional view taken on the line 4—4 of FIG. 2.

FIG. 5 is a perspective view illustrating a modification.

Referring in detail to the drawings, and more particularly to FIGS. 1-4 of the drawings, the numeral 10 indicates the adhesive master of the present invention which consists of the sheet 11 of transparent plastic material, and one surface of the sheet 11 may have a plurality of spaced parallel separators 12 which define channels 13 therebetween. Arranged along each of the channel surfaces 13 is adhesive or channel emulsion 18 which may be arranged in spaced parallel rows. While these separators are important they are not critical to the basic concept of the invention, and it is possible for some sort of template to be used for the laying down of the film.

As shown in the drawings, there is provided removable shield or channel cover means, and in FIGS. 1-4 this is shown to consist of a plurality of separate removable strips 19 which are adapted to be made of a suitable material such as paper. The numeral 20 indicates film in FIGS. 2 and 4 which has been placed along the channels 18 with the film 20 having its emulsion arranged face up, and this film is adapted to fit securely to the adhesive.

From the foregoing, it will be seen that there has been provided a strip up type of microfilm jacket which is especially useful in the microfilm field. As shown in FIGS. 1, 2 and 3, the member 10 consists of a sheet of transparent plastic material 11 which is adapted to have separators 12 thereon that can define therebetween spaced parallel channels or zones 13. The channels or zones 13 are adapted to have adhesive such as the adhesive 18 thereon, and this adhesive may be placed in spaced parallel rows. Initially the strips or shields 19 are adapted to be maintained in place in protective relationship on the channel surfaces 13 due to the adhesive 18, and then when it is desired to use the device of FIGS. 1, 2 and 3 it is only necessary to manually peel or remove one or more of the protective shields 19, and afterwards film such as the film strips 20 can be placed along the channel emulsion or adhesive 18 in order to secure the film 20 in place to the fiche. FIGS. 2 and 4 illustrate portions of the completed device, while FIGS. 1 and 3 show the article before the film is secured to the fiche.

Attention is now directed to FIG. 5 which shows a modification or alternative construction which consists of the sheet 11, together with a solid sheet of protective paper 22 which may be an alternate construction to the strips, and this can be provided in the continuous length or in cut pieces. In other words, whether the masterfiche is in cut pieces or the continuous length the masterfiche is all in one solid sheet.

It will therefore be seen that in accordance with the present invention there is provided a method of and means for converting roll film to microfiche masters, wherein the present invention easily converts roll film to a unit filing system without costly preparation. The strip-up microfiche can be used as a master to make perfect distribution copies with minimum resolution loss, and the present invention provides a highly flexible system which allows for the addition or deletion of images as desired or required, and the present invention is ideal for small or large installations.

In actual use a simple three-step procedure serves to convert roll file systems to microfiche, and this consists in first typing identification of fiche on transparent tape such as the tape 15 which is adapted to be placed at the top 14 of the fiche. Then the protection channel cover such as the cover 19 or the cover 22 is adapted to be peeled away and finally film such as the film 20 is adapted to be placed along the channels 13 with the film 20 having its emulsion arranged face up, and then the film is adapted to be pressed on firmly to the fiche. With the present invention roll film can be readily transformed into microfiche masters which will reproduce high quality copies. It will be seen that with the present invention the shield is removed when the device is ready for use when strips of 16 mm. or 35 mm. film are then laid down in rolls on the microfiche.

This arrangement is somewhat similar to a microfilm jacket having individual chambers into which the film is inserted, but the differences here is that the film such as the film 20 lays on top of the surface of the jacket with the emulsion exposed. An important advantage is that in duplicating this strip-up microfiche better results can be obtained due to the fact that the emulsion can then be placed in contact with the emulsion of the copying film.

The present invention is a one-step operation which provides certain important advantages or differences over the prior methods or devices.

Various modifications or alternative arrangements can be utilized and, for example, can be provided in cut to size pieces such as a standard 4" x 6" size with five channels 13 and an indexing area 14 at the top. The same principle can be used in a continuous roll arrangement such as the arrangement shown in FIG. 5. The longer roll shown in FIG. 5 is especially suitable and adaptable to automatic equipment for reproducing from this masterfiche to diazo copies. Also automatic equipment for handling of microfiche with the adhesive may be provided. The present invention is especially convenient for organizing the roll film to make microfiche originals, and wherein minimum distortion and perfect clarity is assured, and wherein the film can be readily and easily inserted or maintained in place.

It is to be noted that with the present invention rows of microfilm adhesive are adapted to be placed on a single sheet rather than along a film roll, and such sheets are commercially known as microfiches, and wherein the microfilms are generally arranged in parallel rows with respect to each other, and as is well known such a microfiche is useful when it is desired to incorporate on a single reproducible sheet documents or other information relating to a particular subject matter or the like.

In accordance with the present invention it will be seen that there has been provided a microfiche master already prepared with adhesive strips in a predetermined path permitting the laying down of the microfilm. An important aspect of the present invention is that the microfilm itself does not have to be prepared in any way and that the master is now adapted, with the adhesive prepared, to accept the laying down of the film. This is not only economical and easier to handle but, in addition, permits the selection of microfilm frames at random or as desired from different rolls for placement on this master.

In the drawings, a particular type of separator has been illustrated, and it is to be understood that this is for illustrative purposes only and, although the separators are an added and important feature, they are not critical to the basic concept of this invention. Thus, other alternative arrangements can be used and, for example, guide lines can be printed on the material itself or a suitable template or the like can be used for the laying down of the film.

The solid sheet of paper is an alternative to the strips of paper and can be provided in the continuous length or in cut pieces. In other words, the protective paper can be in strips or in one solid sheet.

Another important feature or aspect of the invention is as follows:

A master of this type can be used to add film at any time by pulling the master out of the file, exposing more of the adhesive strips by removing more paper and adding additional film. This "add-an-image" capability is quite important in items of this type. Microfiche are normally manufactured by filming directly onto sensitized material with a step and repeat camera or similar device and, in addition, there is the method for preparing rolls of film with adhesive on the film before placing it down, and this provides a key to the present invention inasmuch as it is already known to put the adhesive on the film and then lay it onto a piece of acetate or the like. There are additional difficulties with the prior methods or systems that are overcome by the present invention. Other methods or devices also permit the film to lay on top of the microfilm jacket with the emulsion exposed, but such methods are not as convenient. The present invention provides a one-step operation as compared to the previous multi-step operations.

With the present invention the roll of film concept permits the adaptation of microfiche to a roll to roll concept which is more efficient and quicker than other methods. As previously stated the protective cover or paper can be provided in strips, sheet form or cut pieces.

What is claimed is:

1. A strip up microfiche master, comprising a sheet of transparent material having an identification area on one portion of the sheet, adhesive arranged in spaced parallel narrow rows along one side of the sheet, there being wider areas of non-adhesive defined and provided between the rows of adhesive, at least one removable cover member releasably engaging said adhesive, and said cover member adapted to be selectively removed from the adhesive, strips of film with emulsion thereon, and said strips having the emulsion arranged face up away from the adhesive, said adhesive receiving the strips after the cover member is removed from the adhesive, said strips of film having their longitudinal side edges engaging the adhesive, the width of the strips of film being approximately equal to the distance between adjacent rows of adhesive.

References Cited

UNITED STATES PATENTS

| | | | |
|---|---|---|---|
| 2,871,601 | 2/1959 | Warnow | 161—406X |
| 2,815,252 | 12/1957 | Baker | 161—406X |
| 2,247,252 | 6%1941 | Price | 206—56 |
| 2,095,437 | 10/1937 | Fox | 161—406X |
| 1,987,246 | 1/1935 | Rounds | 156—291X |

PHILIP DIER, Primary Examiner

U.S. Cl. X.R.

161—146, 406; 156—247,291; 206—59